US012638615B2

(12) United States Patent
Lu et al.

(10) Patent No.: US 12,638,615 B2
(45) Date of Patent: May 26, 2026

(54) COATED ARTICLES DEMONSTRATING ANTI-REFLECTION, CONTAMINANT BUILD-UP RESISTANCE AND UV DURABILITY

(71) Applicant: PPG Industries Ohio, Inc., Cleveland, OH (US)

(72) Inventors: Songwei Lu, Wexford, PA (US); Jiping Shao, Sewickley, PA (US); Zilu Li, Allison Park, PA (US); John D. Basil, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 358 days.

(21) Appl. No.: 18/259,804

(22) PCT Filed: Nov. 3, 2021

(86) PCT No.: PCT/US2021/057849
§ 371 (c)(1),
(2) Date: Jun. 29, 2023

(87) PCT Pub. No.: WO2022/150095
PCT Pub. Date: Jul. 14, 2022

(65) Prior Publication Data
US 2024/0061151 A1      Feb. 22, 2024

Related U.S. Application Data

(60) Provisional application No. 63/134,040, filed on Jan. 5, 2021.

(51) Int. Cl.
| | |
|---|---|
| *B32B 15/04* | (2006.01) |
| *B32B 17/06* | (2006.01) |
| *C03C 17/34* | (2006.01) |
| *G01S 7/481* | (2006.01) |
| *G02B 1/11* | (2015.01) |
| *G02B 1/18* | (2015.01) |

(52) U.S. Cl.
CPC ............ *G02B 1/11* (2013.01); *C03C 17/3405* (2013.01); *G01S 7/4816* (2013.01); *G02B 1/18* (2015.01); *C03C 2217/732* (2013.01)

(58) Field of Classification Search
CPC ............................. C03C 17/3405; G02B 1/11
USPC ........................................................ 428/426
See application file for complete search history.

(56) References Cited

U.S. PATENT DOCUMENTS

| | | | |
|---|---|---|---|
| 6,833,159 | B1 | 12/2004 | Boulineau et al. |
| 7,842,389 | B2 | 11/2010 | Ohashi et al. |
| 7,959,980 | B2 | 6/2011 | Nakajima et al. |
| 8,358,467 | B2 | 1/2013 | Yan et al. |
| 9,461,185 | B2 | 10/2016 | Nair et al. |
| 9,495,876 | B2 | 11/2016 | Lu et al. |
| 9,869,754 | B1 | 1/2018 | Campbell et al. |
| 9,989,629 | B1 | 6/2018 | LaChapelle |
| 10,007,001 | B1 | 6/2018 | LaChapelle et al. |
| 10,168,423 | B2 * | 1/2019 | Lombrozo ............... G01S 7/497 |
| 10,267,898 | B2 | 4/2019 | Campbell et al. |
| 10,267,918 | B2 | 4/2019 | LaChapelle et al. |
| 10,551,605 | B2 | 2/2020 | Arbore et al. |
| 11,567,237 | B2 * | 1/2023 | Hart .................... C03C 17/3411 |
| 11,833,978 | B1 * | 12/2023 | Wilson .................. G01S 7/4811 |
| 12,111,521 | B2 * | 10/2024 | Valenti ..................... G02B 5/28 |
| 12,124,117 | B2 * | 10/2024 | Valenti .................. G02B 1/116 |
| 2010/0328605 | A1 | 12/2010 | Suzuki |
| 2012/0009429 | A1 * | 1/2012 | Shmueli ................. C09D 5/006 106/286.6 |
| 2012/0300170 | A1 * | 11/2012 | Fournand ................. G02B 1/18 351/159.01 |
| 2014/0261615 | A1 | 9/2014 | Nair et al. |
| 2014/0272295 | A1 * | 9/2014 | Deshpande ........ G02B 27/0006 428/141 |
| 2014/0363682 | A1 * | 12/2014 | Matsuda ............... C07F 7/1804 428/447 |
| 2016/0002498 | A1 * | 1/2016 | Maghsoodi .......... C09D 5/1662 428/313.9 |
| 2016/0154254 | A1 * | 6/2016 | Bolshakov ............. G02B 1/115 351/159.66 |
| 2017/0090071 | A1 | 3/2017 | Fukaya et al. |
| 2017/0108622 | A1 | 4/2017 | Uchida et al. |
| 2018/0171154 | A1 * | 6/2018 | Lu ............................. G02B 1/11 |
| 2018/0284247 | A1 | 10/2018 | Campbell et al. |
| 2018/0284268 | A1 | 10/2018 | McWhirter |

(Continued)

FOREIGN PATENT DOCUMENTS

| | | |
|---|---|---|
| CN | 101013166 A | 8/2007 |
| CN | 109715701 A | 5/2019 |

(Continued)

OTHER PUBLICATIONS

Wang Nan et al: "Mechanically Robust Superhydrophobic Steel Surface with Anti-Icing, UV-Durability, and Corrosion Resistance Properties", Applied Materials & Interfaces, vol. 7, No. 11, Mar. 25, 2015, US, pp. 6260-6272, XP055823055, ISSN: 1944-8244.

(Continued)

*Primary Examiner* — Lauren R Colgan

(57) ABSTRACT

The present invention is directed to an article comprising an optical cover assembly. The optical cover assembly comprises: (A) a substrate comprising an outer surface and an opposing inner surface; (B) an optional first coating layer applied directly to at least the outer surface of the substrate; (C) an anti-reflective coating stack comprising at least one coating layer; and (D) a topmost coating layer comprising a fluorosilane polymer on the outer surface of the substrate. The optical cover assembly demonstrates hydrophobicity and extended UV durability, and serves as a component of at least one of a vehicle, a light sensor, a LiDAR detector, a motion sensor, a vision camera, a backup camera, a security camera, an IR camera, a headlight, a taillight, a signal light, a RADAR emitter, a RADAR detector, an aircraft landing light, and a gas detector.

18 Claims, No Drawings

(56)                    References Cited

U.S. PATENT DOCUMENTS

| 2018/0284275 | A1   |         | 10/2018 | LaChapelle          |              |
|--------------|------|---------|---------|---------------------|--------------|
| 2019/0285775 | A1 * | 9/2019  | Zieba   | ................... | C03C 17/3417 |
| 2019/0322893 | A1 * | 10/2019 | Nose    | ...................  | C08G 65/007  |
| 2020/0002567 | A1   |         | 1/2020  | Mitsuhashi et al.   |              |
| 2020/0024241 | A1   |         | 1/2020  | Yamashita et al.    |              |
| 2020/0039356 | A1   |         | 2/2020  | Montione            |              |
| 2020/0056067 | A1   |         | 2/2020  | Mitsuhashi et al.   |              |
| 2020/0310000 | A1 * | 10/2020 | Hart    | .........................  | G02B 1/11    |
| 2020/0371211 | A1   |         | 11/2020 | Sartenaer et al.    |              |
| 2021/0024776 | A1   |         | 1/2021  | Katayama et al.     |              |
| 2021/0277258 | A1   |         | 9/2021  | Mitsuhashi et al.   |              |

FOREIGN PATENT DOCUMENTS

| EP | 2155477      | A1 | 2/2010  |
|----|--------------|----|---------|
| EP | 3518006      | A2 | 7/2019  |
| EP | 3540478      | A2 | 9/2019  |
| EP | 3747930      | A1 | 12/2020 |
| JP | 05-177634    | A  | 7/1993  |
| JP | 2006-171204  | A  | 6/2006  |
| JP | 2008-065110  | A  | 3/2008  |
| JP | 2017-068096  | A  | 4/2017  |
| JP | 2017-076081  | A  | 4/2017  |
| JP | 2019-174796  | A  | 10/2019 |
| KR | 20160057607  | A  | 5/2016  |
| WO | 0010934      | A1 | 3/2000  |
| WO | 2019/176458  | A1 | 9/2019  |

OTHER PUBLICATIONS

International Search Report and Written Opinion received for PCT Application Serial No. PCT/US2021/057849 dated Mar. 7, 2022, 17 pages.

* cited by examiner

COATED ARTICLES DEMONSTRATING ANTI-REFLECTION, CONTAMINANT BUILD-UP RESISTANCE AND UV DURABILITY

CROSS REFERENCE TO RELATED APPLICATIONS

This application is a national stage filing of international patent application PCT/US21/57849, filed Nov. 3, 2021, titled "COATED ARTICLES DEMONSTRATING ANTI-REFLECTION, CONTAMINANT BUILD-UP RESISTANCE AND UV DURABILITY", which in turn claims priority to U.S. Provisional Application No. 63/134,040, filed Jan. 5, 2021, titled "COATED ARTICLES DEMONSTRATING ANTI-REFLECTION, CONTAMINANT BUILD-UP RESISTANCE AND UV DURABILITY", each of which is incorporated herein by reference in their entireties.

FIELD OF THE INVENTION

The present invention relates to anti-reflective coated articles demonstrating contaminant build-up resistance and UV durability.

BACKGROUND OF THE INVENTION

Recent advances have been made in technologies related to self-driving ("autonomous") vehicles and other objects in a vehicle's surroundings including markings that are detectable by a sensor mounted on the autonomous vehicle. Autonomous vehicles use a combination of detecting systems, such as sensors, cameras, radar, ultrasonic, lights and lasers to detect and locate obstacles such that the autonomous vehicle can safely navigate around such objects. Some detecting systems are limited in their ability to detect objects at long distances or in non-ideal environments, such as in inclement weather or due to build-up of dirt and other contaminants, including ice and water in the form of droplets, rivulets, or sheets on detecting system surfaces. Over time, protective coatings exposed to environmental conditions such as sunlight, fluctuating temperatures, rain, snow, etc., may begin to erode from surfaces. Such limitations may prohibit the autonomous vehicle from safely navigating obstacles. Easy cleaning and extended UV durability of coated surfaces of these assemblies is a significant selling point for the autonomous vehicle market, as well as many other industries, in both consumer and industrial markets. Likewise, anti-reflective properties in such assemblies is key to maximizing transmission of electromagnetic radiation to ensure accurate and maximum signal processing.

Easy removal of dirt or other contaminants and prevention of contaminant build-up are desirable properties for products such as automobiles and autonomous vehicles. Environmental contaminants such as tar, asphalt, animal droppings, road salt, detergents, and the like may damage the surface of coated vehicles, architectural surfaces, and other industrial substrates. Damage may be caused by a chemical reaction of the contaminant with the coated surface such as by chemical etching, or may involve physical removal of part or all of the coating from the substrate (i. e., "cohesive failure") upon removal of the contaminant during cleaning. Cohesive failure may also involve incomplete removal of the contaminant from the coated surface during cleaning.

Additionally, short duration of the contaminant mitigation properties of current easy-to-clean ("E2C") coatings, due to poor UV durability, has limited their use.

It would be desirable to provide anti-reflective coated articles demonstrating transparency to electromagnetic radiation, contaminant build-up resistance and UV durability, in order to overcome the disadvantages of the prior art.

SUMMARY OF THE INVENTION

The present invention is directed to coated articles comprising an optical cover assembly, wherein the optical cover assembly comprises:

(A) a substrate comprising an outer surface and an opposing inner surface; wherein the substrate demonstrates a refractive index of at least 1.40 at a light wavelength of 550 nm as determined using Becke Line Method;

(B) an optional first coating layer applied directly to at least the outer surface of the substrate; wherein the first coating layer, if used, has a film thickness of at least 50 nm and less than 45 μm and a refractive index of 1.40 to 1.65 at a light wavelength of 550 nm as determined using Becke Line Method;

(C) an anti-reflective coating stack comprising at least one coating layer, wherein the anti-reflective coating stack is applied directly to the first coating layer (B) if used or applied directly to at least the outer surface of the substrate (A) if the first coating layer is not used, and wherein the anti-reflective coating stack has a total film thickness of at least 50 nm and less than 1.0 μm; and (D) a topmost coating layer comprising a fluorosilane polymer on the outer surface of the substrate. The fluorosilane polymer has a weight average molecular weight of at least 3000 and at most 10,000. The fluorosilane polymer comprises a perfluoropolyether that further comprises organosilane functional groups comprising alkoxysilane and/or alkylsilane groups, and/or the fluorosilane polymer is prepared from one or more monomeric compounds comprising a silane having 1 to 4 fluoroalkyl and/or perfluoroalkyl groups that may be the same or different. The optical cover assembly demonstrates an initial deionized water contact angle of at least 110°, and demonstrates a deionized water contact angle of at least 90° after subjection of the optical cover assembly to test conditions according to ASTM D7869-17 for 3000 hours. The article comprises a component of at least one of a vehicle, a light sensor, a LiDAR detector, a motion sensor, a vision camera, a backup camera, a security camera, an IR camera, a headlight, a taillight, a signal light, a RADAR emitter, a RADAR detector, an aircraft landing light, and a gas detector.

The present invention is also drawn to a LiDAR detector component comprising an optical cover assembly, wherein the optical cover assembly comprises:

(A) a polycarbonate substrate that is transparent at a light wavelength of 905 nm, comprising an outer surface and an opposing inner surface;

(B) a first coating layer comprising an acrylic polymer, a sol-gel, or a polysiloxane polymer applied directly to at least the outer surface of the substrate; wherein the first coating layer has a refractive index of 1.40 to 1.65 at a light wavelength of 550 nm as determined using Becke Line Method and a film thickness of at least 50 nm and less than 45 μm;

(C) an anti-reflective coating stack comprising at least one coating layer applied directly to the first coating layer, wherein the anti-reflective coating stack has a total film thickness of at least 50 nm and less than 1.0 µm; and (D) a topmost coating layer comprising a fluorosilane polymer as described above on the outer surface of the substrate, wherein the optical cover assembly demonstrates an initial deionized water contact angle of at least 110°, and demonstrates a deionized water contact angle of at least 90° after subjection of the optical cover assembly to test conditions according to ASTM D7869-17 for 3000 hours.

The present invention is also drawn to a LiDAR detector component comprising an optical cover assembly, wherein the optical cover assembly comprises:

(A) a glass substrate that is transparent at a light wavelength of 905 nm, comprising an outer surface and an opposing inner surface; wherein the glass substrate comprises soda-lime glass, aluminum-silicate glass, boron-silicate glass, or silica glass;

(B) an anti-reflective coating stack comprising at least one coating layer applied directly to the first coating layer, wherein the anti-reflective coating stack has a total film thickness of at least 50 nm and less than 1.0 µm; and (C) a topmost coating layer comprising a fluorosilane polymer as described above on the outer surface of the substrate, wherein the optical cover assembly demonstrates an initial deionized water contact angle of at least 110°, and demonstrates a deionized water contact angle of at least 99° after subjection of the optical cover assembly to test conditions according to ASTM D7869-17 for 3000 hours.

The present invention is also drawn to a vehicle headlight cover comprising an optical cover assembly, wherein the optical cover assembly comprises:

(A) a polycarbonate substrate comprising an outer surface and an opposing inner surface;

(B) a first coating layer comprising an acrylic polymer, a sol-gel, or a polysiloxane polymer applied directly to at least the outer surface of the substrate; wherein the first coating layer has a refractive index of 1.40 to 1.65 at a light wavelength of 550 nm as determined using Becke Line Method and a film thickness of at least 50 nm and less than 45 µm;

(C) an anti-reflective coating stack comprising at least one coating layer applied directly to the first coating layer, wherein the anti-reflective coating stack has a total film thickness of at least 50 nm and less than 1.0 µm; and (D) a topmost coating layer comprising a fluorosilane polymer as described above on the outer surface of the substrate, wherein the optical cover assembly demonstrates an initial deionized water contact angle of at least 110°, and demonstrates a deionized water contact angle of at least 90° after subjection of the optical cover assembly to test conditions according to ASTM D7869-17 for 3000 hours.

The present invention is also drawn to a camera component comprising an optical cover assembly, wherein the optical cover assembly comprises:

(A) a glass substrate comprising an outer surface and an opposing inner surface; wherein the glass substrate comprises soda-lime glass, aluminum-silicate glass, boron-silicate glass, or silica glass;

(B) an anti-reflective coating stack comprising at least one coating layer applied directly to the first coating layer, wherein the anti-reflective coating stack has a total film thickness of at least 50 nm and less than 1.0 µm; and (C) a topmost coating layer comprising a fluorosilane polymer as described above on the outer surface of the substrate, wherein the optical cover assembly demonstrates an initial deionized water contact angle of at least 110°, and demonstrates a deionized water contact angle of at least 90° after subjection of the optical cover assembly to test conditions according to ASTM D7869-17 for 3000 hours.

DETAILED DESCRIPTION OF THE INVENTION

Other than in any operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used in this specification and the appended claims, the articles "a", "an", and "the" include plural referents unless expressly and unequivocally limited to one referent.

The various embodiments and examples of the present invention as presented herein are each understood to be non-limiting with respect to the scope of the invention.

By "optical" is meant pertaining to or associated with light and/or vision. For example, the optical element or device can comprise sheet products such as display elements and devices, screens, and windows through which light is transmitted. By "cover" is meant a screen or lens. The substrate (A) used in the optical cover assemblies and articles of the present invention may comprise glass or any of various polymers. Suitable glass substrates include soda-lime-silica glass, or aluminosilicate glass such as Gorilla® glass from Corning Incorporated, borosilicate glass from Schott AG, or Dragontrail® glass from Asahi Glass Co., Ltd.

Suitable examples of plastic substrates include polymers prepared from polyol(allyl carbonate) monomers, e.g., allyl diglycol carbonates such as diethylene glycol bis(allyl carbonate), which monomer is sold under the trademark CR-39 by PPG Industries, Inc.; polyurea-polyurethane (polyurea urethane) polymers, which are prepared, for example, by the reaction of a polyurethane prepolymer and a diamine curing agent, a composition for one such polymer being sold under the trademark TRIVEX® by PPG Industries, Inc.; polymers prepared from polyol(meth)acryloyl terminated carbonate monomer, diethylene glycol dimethacrylate monomers, ethoxylated phenol methacrylate monomers, diisopropenyl benzene monomers, ethoxylated trimethylol propane triacrylate monomers, ethylene glycol bismethacrylate monomers, poly(ethylene glycol) bismethacrylate monomers, or urethane acrylate monomers; poly(ethoxylated Bisphenol A dimethacrylate); poly(vinyl acetate); poly(vinyl alcohol); poly(vinyl chloride); poly(vinylidene chloride); polyethylene; polypropylene; polyurethanes; polythiourethanes; polycarbonates, such as the carbonate-linked resin derived from Bisphenol A and phosgene, such materials being sold under the trademarks LEXAN and TUFFAK; polyesters, such as the material sold under the trademark MYLAR; poly(ethylene terephthalate); polyvinyl butyral; poly(methyl methacrylate), such as the material sold under the trademark PLEXIGLAS, and polymers prepared by reacting polyfunctional isocyanates with polythiols or polyepisulfide monomers, either homopolymerized or co- and/or terpolymerized with polythiols, polyisocyanates, polyisothiocyanates and optionally ethylenically unsaturated monomers or halogenated aromatic-containing vinyl monomers. Also suitable are copolymers of such monomers and blends of the described polymers and copolymers with other polymers, e.g., to form interpenetrating network products.

The substrate is typically transparent and has an outer surface and an opposing inner surface, each of which may independently be, for example, flat, convex, or concave. By "outer" surface is meant a surface that is oriented toward and/or exposed to an exterior of the assembly and to the atmosphere. By 'transparent' is meant the property of transmitting electromagnetic radiation (visible or otherwise) without appreciable light scattering, which causes transmission loss. When viewed through a substrate transparent to visible light, objects lying beyond are entirely visible. As used herein, transparent substrates and coatings may demonstrate a light transmittance (% Transmission, as defined by Equation 1 below using visible light) of at least 70%. A test article is mounted between electromagnetic radiation transmitter and receiver antennas with the coated side of the substrate facing the transmitter. Water may be spray applied to the coated substrates prior to measurement. The insertion loss (IL) is measured and refers to the amount of transmitted signal that was not detected at the receiver. This method assumes a "lossless" condition in which the substrate either does not absorb or absorbs an insignificant amount of the incident radar frequency.

$$\% \text{ Transmission} = 100 \times 10^{IL/10} \qquad \text{Equation 1.}$$

Additionally, the substrates used to prepare the articles of the present invention are transparent to electromagnetic radiation used in signaling devices such as transmitters and receivers for autonomous vehicles, including both short range and long range frequencies. For example, substrates used in an optical cover assembly that is a component of a LiDAR detector are typically transparent (i.e., demonstrate a % Transmission of at least 70) to electromagnetic radiation having a light wavelength of 905 nm, but may not be transparent to other wavelengths such as in the visible range. Sufficient transparency of a substrate or coating promotes accurate and maximum emission and/or sensing of a light signal in a device of which the substrate and/or coating is a component, such as a sensor/detector, signal emitter, light source, or camera.

In certain examples of the present invention, the substrate (A) demonstrates a refractive index of at least 1.40, or at least 1.60, at a light wavelength of 550 nm as determined using the Becke Line Method. In the Becke Line Method, small portions (often particulate scrapings) of a sample of the material to be tested is immersed in a series of liquids of known refractive index and examined using a polarized light microscope. The degree of contrast exhibited by the particles indicates the degree of difference in refractive index between the particles and the liquid. When the liquid has a refractive index different from that of the specimen, a line or narrow band of light (Becke line) can be observed around or just within the outlines of the specimen. The movement of this line can be observed as the microscope focus is changed from best focus to slightly above best focus. The presence of the line indicates a difference between the refractive index of the material and the mounting liquid, and its absence indicates a match in refractive index.

The optical cover assemblies used to prepare the articles of the present invention may optionally comprise (B) a first coating layer applied directly to at least the outer surface of the substrate. It may be applied to both opposing surfaces of the substrate. The first coating layer, if used, has a film thickness of at least 50 nm, or at least 500 nm, or at least 750 nm, and at most 45 μm, or at most 25 μm, or at most 1 μm, and a refractive index of at least 1.40 or at least 1.42, or at least 1.45, to at most 1.65, or at most 1.62, or at most 1.60 at a light wavelength of 550 nm as determined using Becke Line Method. For example, the first coating layer may have a film thickness of 50 nm to 45 μm, or 50 nm to 25 μm, or 50 nm to 1 urn, or 500 nm to 45 μm, or 500 nm to 25 μm, or 500 nm to 1 μm, or 750 nm to 45 μm, or 750 nm to 25 μm, or 750 nm to 1 μm. Additionally, the first coating layer may demonstrate a refractive index of 1.40 to 1.65, or 1.40 to 1.62, or 1.40 to 1.60, or 1.42 to 1.65, or 1.42 to 1.62, or 1.42 to 1.60, or 1.45 to 1.65, or 1.45 to 1.62, or 1.45 to 1.60, at a light wavelength of 550 μm as determined using Becke Line Method.

Note that film thicknesses of all coatings described herein, unless otherwise noted, refer to the dry film thickness of the coating.

The first coating layer (B) is primarily suitable over a polymeric substrate such as polycarbonate, and typically comprises a "hardcoat" composition as known in the art of optical coatings. The first coating layer (B) may, for example, comprise an acrylic polymer, a sol-gel coating such as that disclosed in United States Patent Application Publication Number 2002/0061407A1, or a polysiloxane polymer. Examples of polysiloxane hardcoats are commercially available as CrystalCoat from SDC Technologies Inc., Irvine, Calif., and other suitable hardcoats are commercially available from Red Spot Corporation, Evansville, Ind., or Momentive Performance Materials, Strongsville, OH. The first coating layer (B) may be deposited by any of various methods such as dip-coating, spin-coating, roll-coating, flow-coating, meniscus coating, or spray-coating. Compositions used to prepare the hardcoat may be UV radiation curable, IR radiation curable, or thermally curable. The term "curable", as used for example in connection with a curable composition, means that the indicated composition is polymerizable or cross linkable through functional groups, e.g., by means that include, but are not limited to, thermal (including ambient cure) and/or catalytic exposure. The term "cure" "cured" or similar terms, as used in connection with a cured or curable composition, e.g., a "cured composition" of some specific description, means that at least a portion of the polymerizable and/or crosslinkable components that form the curable composition is polymerized and/or cross-linked. Additionally, curing of a polymerizable composition refers to subjecting said composition to curing conditions such as but not limited to thermal curing, leading to the reaction of the reactive functional groups of the composition, and resulting in polymerization and formation of a polymerizate. When a polymerizable composition is subjected to curing conditions, following polymerization and after reaction of most of the reactive end groups occurs, the rate of reaction of the remaining unreacted reactive end groups becomes progressively slower. The polymerizable composition can be subjected to curing conditions until it is at least partially cured. The term "at least partially cured" means subjecting the polymerizable composition to curing conditions, wherein reaction of at least a portion, such as at least 10 percent, or at least 20 percent, of the reactive groups of the composition occurs, to form a polymerizate. The polymerizable composition can also be subjected to curing conditions such that a substantially complete cure is attained (such as at least 70 percent, or at least 80 percent, or at least 90 percent up to 100 percent, of the reactive groups react) and wherein further curing results in no significant further improvement in polymer properties, such as hardness.

Before the deposition of the first coating layer (B), the surface of the article may be modified by any of a number of well-known techniques such as corona or plasma discharge or chemical etching (particularly using a NaOH or KOH solution) to enhance adhesion. Each of the coating layers described herein may be independently applied using conventional techniques, including physical vapor deposition (PVD), chemical vapor deposition (CVD), a slot-die coating process, a spray-coating process, a spin-coating process, or a dip-coating process.

The optical cover assemblies used to prepare the articles of the present invention further comprise (C) an anti-reflective coating stack applied directly to the first coating layer (B) if used, or applied directly to at least the outer surface of the substrate (A) if the first coating layer (B) is not used. Typically, when the substrate (A) comprises a glass such as soda-lime glass, aluminum-silicate glass, boron-silicate glass, or silica glass, the anti-reflective coating stack (C) is applied directly to the outer surface of the substrate (A).

By "stack" is meant at least one coating layer, more often multiple coating layers; usually two to five coating layers. When multiple coating layers are used to form the anti-reflective coating stack (C), adjacent layers typically have different refractive indices. For example, a low refractive index layer (such as 1.40 to 1.48) may be adjacent an intermediate refractive index layer (such as 1.62 to 1.85) or a high refractive index layer (such as 1.90 to 2.10). Such layers may be present in the stack in any combination of differing refractive indices.

In certain examples of the present invention, at least one of the coating layers in the anti-reflective coating stack (C) is formed from at least one of $SiO_2$, $SiO_x$ where x is between 1 and 2 including 1, $ZrO_2$, $TiO_2$, TiO, $Ti_2O_3$, $Ti_2O_5$, $Al_2O_3$, $Ta_2O_5$, $CeO_2$, MgO, ZnO, $Nb_2O_5$, $Y_2O_3$, $SnO_2$, $MgF_2$, and $WO_3$. Such coatings are typically applied via physical vapor deposition (PVD). Often, none of the coating layers via PVD in the anti-reflective coating stack (C) are formed from alkoxysilane-containing compositions.

The anti-reflective coating stack (C) has a total film thickness of at least 50 nm, or at least 250 nm, or at least 500 nm, and at most 1.0 μm, or at most 900 nm, or at most 800 nm. For example, the anti-reflective coating stack (C) may have a film thickness of 50 nm to 1 prn, or 50 nm to 900 nm, or 50 nm to 800 nm, or 250 nm to 1 μm, or 250 nm to 900 nm, or 250 nm to 800 nm, or 500 nm to 1 μm, or 500 nm to 900 nm, or 500 nm to 800 nm. The film thickness of each layer tends to be internally consistent across its cross section. For example, in certain examples of the present invention, the film thickness of each layer of the anti-reflective coating stack (C) varies across its cross section by no more than 5 nm, or 3 nm, or 1 nm.

As noted above, each of the multiple coating layers in the anti-reflective coating stack (C) demonstrates a different refractive index from the layer adjacent. The reflective index and thicknesses of each layer are chosen to produce destructive interference in the light beams reflected from the interfaces, and constructive interference in the corresponding transmitted light beams. As a result, the total reflectance from the coated article is significantly reduced compared to the uncoated substrate. The refractive index and thickness of each layer, and the configuration of the coating stack can be optimized so that the magnitude of the total reflectance reduction from the coated article is maximized. Hence, a multi-layer antireflective coating is defined as an optical coating stack with two or more layers, each with a chosen refractive index and thickness and with a specific order of layers, configured to increase the destructive interference in reflective beams so that the total reflection reduction is maximized. From a different perspective, it may be said that the coating stack is configured to increase the constructive interference in the corresponding transmitted beams so that the total transmittance increase is maximized. The antireflective coating performance can be measured by the reflectance from a single side by excluding the reflectance from the other side, or by the total reflectance from both sides, or by the total transmittance. The effect of an antireflective coating may also be defined as the reduction of the reflectance ΔR from a single side or both sides of a substrate, or the increase of transmittance ΔT. Since the light absorption of the antireflective coating stack is usually negligible, the reduction of the reflectance roughly equals to the increase of the transmittance, i.e. ΔR=ΔT. The greater the ΔR or ΔT, the better the antireflective coating performance. ΔR or ΔT can be calculated from the difference between the reflectance or transmittance of a coated article and that of an uncoated substrate. In the case of a coating only on a single side of the substrate, the reflectance of the coated article is less than that of an uncoated substrate, or the transmittance of the coated article is more than that of an uncoated substrate for the coating to be considered antireflective.

In certain examples of the present invention, the optical cover assembly demonstrates a single side integrated specular-only reflectance of less than 1.5%, or less than 1.0%, or less than 0.5%, in a wavelength range from 450 nm to 650 nm. Additionally or alternatively, the optical cover assembly may demonstrate a single side integrated specular-only reflectance of less than 1.5%, or less than 1.0%, or less than 0.5% in a wavelength range from 895 nm to 915 nm. The single side integrated specular-only reflectance of coated samples is measured using a Perkin Elmer Lambda 1050 spectrophotometer with PMT/ingaas 150 mm integrating sphere. A black electrical tape is applied to the back surface of the glass substrate at the measurement location. The tape is then rubbed completely with the back end of a marker or pen to remove all air and provide complete contact between the glass surface and the adhesive of the tape. Reflectance measurements are made with a specular mirror as the reference material. The 0% line is collected with a custom light trap at the reflectance port. Total (specular included) reflectance measurements are made with the Spectral on plug installed in the specular spot of the sphere, and diffuse (specular excluded) reflectance measurements are made with the Spectral on plug removed from the specular spot of the sphere. Specular only reflectance is determined by subtracting the specular excluded spectra from the specular included spectra.

The optical cover assemblies used to prepare the articles of the present invention further comprise (D) a topmost coating layer comprising a fluorosilane polymer on the outer surface of the substrate. The fluorosilane polymer in the topmost coating layer (D) has a weight average molecular weight of at least 3000, such as at least 3500, and at most 10,000, such as at most 7000. In certain examples of the present invention, the fluorosilane polymer has a weight average molecular weight of 3000 to 7000, such as 4000. Weight average molecular weights are measured by gel permeation chromatography using a polystyrene standard. The fluorosilane polymer may comprise a perfluoropolyether that further comprises organosilane functional groups such as alkoxysilane and/or alkylsilane groups. The fluorosilane polymer may additionally or alternatively be prepared from one or more monomeric compounds such as a silane having 1 to 4 fluoroalkyl and/or perfluoroalkyl groups that may be the same or different. Combinations of fluorosilanes may be used in the topmost coating layer (D), provided at least one of them comprises a fluorosilane polymer as defined above. The composition used to form the topmost coating layer (D) may further comprise other organosilanes such as alkoxysilanes and/or alkylsilanes, which may be chlorinated.

The topmost coating layer (D) may be applied either directly to the anti-reflective coating stack (C) or indirectly to the anti-reflective coating stack (C) on top of an intervening layer such as a tie layer. This topmost coating layer is typically exposed to atmospheric conditions and provides significant UV durability and hydrophobicity to the optical cover assembly. By "hydrophobic" is meant that the material described as such (e. g., a monomer or polymer) has non-polar properties and has a tendency to interact with, be miscible with, or be dissolved by non-polar solvents such as alkanes and oils. By definition, a molecule may be nonpolar either when there is an equal sharing of electrons between the two atoms of a diatomic molecule or because of the symmetrical arrangement of polar bonds in a more complex molecule, such that there is no overall dipole in the molecule. In the present invention, "hydrophobicity" is understood to mean that the optical cover assembly demonstrates an initial deionized water contact angle of at least 110°, or at least 112°, or at least 115°. By "contact angle" is meant static contact angle, measured via a sessile drop measurement technique using an optical goniometer/tensiometer such as a VGA Optima Water Contact Angle Analyzer from AST Products, Billerica, MA. A droplet of deionized water with 1 µl in volume is placed on the outer surface of a sample of the optical cover assembly and an image of the droplet is recorded. The static contact angle is then defined by fitting the Young-Laplace equation around the droplet using image analysis software.

By "UV durable" is meant that the optical cover assembly demonstrates a deionized water contact angle of at least 90° after subjection of the optical cover assembly to test conditions according to ASTM D7869-17 (published March 2017) for 3000 hours.

For a visibly transparent optical cover assembly, the optical cover assembly used to prepare the article of the present invention typically demonstrates a haze value of less than 0.5% after subjection of the optical cover assembly to test conditions according to ASTM D7869-17 for 3000 hours. Haze is defined as the forward scattering of light from the surface of a nearly clear sample viewed in transmission—only light which is scattered more than 2.5 degrees from incident is considered to contribute to haze. Haze is the percentage of light diffusely scattered compared to the total light transmitted. Haze values are measured at 550 nanometers using, for example, a HazeGard Plus haze meter, available from BYK-Gardner, under test conditions according to ASTM D-1003 (published 2003).

The topmost coating layer (D) has a film thickness of at least 1 nm, or at least 5 nm, or at least 10 nm, and at most 50 nm, or at most 40 nm, or at most 30 nm. For example, the topmost coating layer (D) may have a film thickness of 1 nm to 50 nm, or 1 nm to 40 nm, or 1 nm to 30 nm, or 5 nm to 50 nm, or 5 nm to 40 nm, or 5 nm to 30 nm, or 10 nm to 50 nm, or 10 nm to 40 nm, or 10 nm to 30 nm. Typically, the topmost coating layer (D) has a thickness of less than 50 nm.

The article of the present invention comprises a component of at least one of a vehicle, a light sensor, a LiDAR detector, a motion sensor, a vision camera, a backup camera, a security camera, an IR camera, a headlight, a taillight, a signal light, a RADAR emitter, a RADAR detector, an aircraft landing light, and a gas detector. One or more of the components may be in an autonomous vehicle. In particular examples of the present invention, the article is a component of a vision camera, a light sensor, a LIDAR detector, a motion sensor, a backup camera, or a light (e. g., headlight, taillight, brake light, etc.) on an autonomous vehicle.

In a particular example of the present invention, each of the coating layers (B) and (C) are coated on both opposing surfaces of the substrate, and the optical cover assembly further comprises (D') an anti-fogging coating layer applied as a topmost layer on the inner surface of the substrate, either directly to the anti-reflective coating stack (C) or indirectly to the anti-reflective coating stack (C) on top of an intervening layer. The anti-fogging coating layer (D') demonstrates an initial water contact angle of less than 15°, or less than 10°, or less than 5°. This structure is particularly suitable when the optical cover assembly is a component of a headlight, such as a headlight cover described below.

The present invention is further drawn to a vehicle headlight cover comprising an optical cover assembly, wherein the optical cover assembly comprises:

(A) a polycarbonate substrate comprising an outer surface and an opposing inner surface;

(B) a first coating layer comprising an acrylic polymer, a sol-gel, or a polysiloxane polymer as described above applied directly to at least the outer surface of the substrate; wherein the first coating layer has a refractive index of 1.40 to 1.65 at a light wavelength of 550 nm as determined using Becke Line Method and a film thickness of at least 50 nm and less than 45 µm;

(C) an anti-reflective coating stack as described above comprising at least one coating layer applied directly to the first coating layer, wherein the anti-reflective coating stack has a total film thickness of at least 50 nm and less than 1.0 µm; and (D) a topmost coating layer as described above comprising a fluorosilane polymer as described above on the outer surface of the substrate, which may be applied either directly to the anti-reflective coating stack (C) or indirectly to the anti-reflective coating stack (C) on top of an intervening layer, wherein the optical cover assembly demonstrates an initial deionized water contact angle of at least 110°, or at least 112°, or at least 115°, and demonstrates a deionized water contact angle of at least 90° after subjection of the optical cover assembly to test conditions according to ASTM D7869-17 for 3000 hours.

The optical cover assembly used in the vehicle headlight cover of the present invention typically demonstrates a single side integrated specular-only reflectance of less than 1.5%, or less than 1.0%, or less than 0.5%, in a wavelength range from 450 nm to 650 nm. Additionally, the optical cover assembly used in the vehicle headlight cover of the present invention typically demonstrates a haze value of less than 0.5% after subjection of the optical cover assembly to test conditions according to ASTM D7869-17 for 3000 hours.

In another particular example, the present invention is drawn to a LiDAR detector component comprising an optical cover assembly, wherein the optical cover assembly comprises:

(A) a polycarbonate substrate that is transparent at a light wavelength of 905 nm (note that it may or may not be transparent to visible light), comprising an outer surface and an opposing inner surface;

(B) a first coating layer comprising an acrylic polymer, a sol-gel, or a polysiloxane polymer as described above applied directly to at least the outer surface of the substrate; wherein the first coating layer has a refractive index of 1.40 to 1.65 at a light wavelength of 550 nm as determined using Becke Line Method and a film thickness of at least 50 nm and less than 45 μm;

(C) an anti-reflective coating stack as described above comprising at least one coating layer applied directly to the first coating layer, wherein the anti-reflective coating stack has a total film thickness of at least 50 nm and less than 1.0 μm; and (D) a topmost coating layer as described above comprising a fluorosilane polymer as described above on the outer surface of the substrate, which may be applied either directly to the anti-reflective coating stack (C) or indirectly to the anti-reflective coating stack (C) on top of an intervening layer, wherein the optical cover assembly demonstrates an initial deionized water contact angle of at least 110°, or at least 112°, or at least 115°, and demonstrates a deionized water contact angle of at least 90° after subjection of the optical cover assembly to test conditions according to ASTM D7869-17 for 3000 hours.

In an alternative example of a LiDAR detector component of the present invention, the substrate (A) may comprise a glass substrate that is transparent at a light wavelength of 905 nm (again, it may or may not be transparent to visible light), comprising an outer surface and an opposing inner surface; wherein the glass substrate comprises soda-lime glass, aluminum-silicate glass, boron-silicate glass, or silica glass. In this scenario, the first coating layer (B) is optional.

In both examples of the LiDAR detector component, the anti-reflective coating stack may be coated on both opposing surfaces of the substrate (either on top of the first coating layer if it is present or directly on the substrate), and the optical cover assembly may further comprise an anti-fogging coating layer applied as a topmost layer on the inner surface of the substrate, either directly to the anti-reflective coating stack (C) or indirectly to the anti-reflective coating stack (C) on top of an intervening layer. The anti-fogging coating layer demonstrates an initial water contact angle of less than 15°, or less than 10°, or less than 5°.

In another example of the present invention, a camera component is provided comprising an optical cover assembly, wherein the optical cover assembly comprises:

(A) a glass substrate comprising an outer surface and an opposing inner surface; wherein the glass substrate comprises soda-lime glass, aluminum-silicate glass, boron-silicate glass, or silica glass;

(B) an anti-reflective coating stack comprising at least one coating layer applied directly to the first coating layer, wherein the anti-reflective coating stack has a total film thickness of at least 50 nm and less than 1.0 μm; and (C) a topmost coating layer comprising a fluorosilane polymer as described above on the outer surface of the substrate, which may be applied either directly to the anti-reflective coating stack (B) or indirectly to the anti-reflective coating stack (B) on top of an intervening layer, wherein the optical cover assembly demonstrates an initial deionized water contact angle of at least 110°, or at least 112°, or at least 115°, and demonstrates a deionized water contact angle of at least 900 after subjection of the optical cover assembly to test conditions according to ASTM D7869-17 for 3000 hours. The camera component is useful on a vehicle and may comprise a lens and/or lens screen.

The anti-reflective coating stack used in the camera component may be coated on both opposing surfaces of the substrate, and the optical cover assembly may further comprise an anti-fogging coating layer applied as a topmost layer on the inner surface of the substrate, either directly to the anti-reflective coating stack (B) or indirectly to the anti-reflective coating stack (B) on top of an intervening layer. The anti-fogging coating layer demonstrates an initial water contact angle of less than 15°, or less than 100, or less than 5°.

The optical cover assembly used in the camera component of the present invention typically demonstrates a single side integrated specular-only reflectance of less than 1.5%, or less than 1.0%, or less than 0.5%, in a wavelength range from 450 nm to 650 nm. Additionally, the optical cover assembly used in the camera component of the present invention typically demonstrates a haze value of less than 0.5% after subjection of the optical cover assembly to test conditions according to ASTM D7869-17 for 3000 hours.

Many vehicles in use today, including autonomous vehicles, utilize components such as transmitters and sensors to send and receive signals for various purposes. It is vital for the continued accurate and safe operation of such vehicles that these signals, which are typically electromagnetic radiation in the form of radio waves, do not get impeded in any way. Coated substrates covering the transmitters and sensors must allow for transmission of the signals therethrough. Mitigating contaminant build up and extending the durability of these components by using the articles of the present invention is particularly beneficial.

Each of the embodiments and characteristics described above, and combinations thereof, may be said to be encompassed by the present invention. For example, the present invention is thus drawn to the following nonlimiting aspects:

In a first aspect, an article comprising an optical cover assembly wherein the optical cover assembly comprises:

(A) a substrate comprising an outer surface and an opposing inner surface; wherein the substrate demonstrates a refractive index of at least 1.40 at a light wavelength of 550 nm as determined using Becke Line Method;

(B) an optional first coating layer applied directly to at least the outer surface of the substrate; wherein the first coating layer, if used, has a film thickness of at least 50 nm and less than 45 μm and a refractive index of 1.40 to 1.65 at a light wavelength of 550 nm as determined using Becke Line Method;

(C) an anti-reflective coating stack comprising at least one coating layer, wherein the anti-reflective coating stack is applied directly to the first coating layer (B) if used or applied directly to at least the outer surface of the substrate (A) if the first coating layer is not used, and wherein the anti-reflective coating stack has a total film thickness of at least 50 nm and less than 1.0 μm; and (D) a topmost coating layer comprising a fluorosilane polymer on the outer surface of the substrate; wherein the fluorosilane polymer has a weight average molecular weight of at least 3000, or at least 3500, and at most 10,000, or at most 7000, and wherein the fluorosilane polymer comprises a perfluoropolyether that further comprises organosilane functional groups comprising alkoxysilane and/or alkylsilane groups, and/or wherein the fluorosilane polymer is prepared from one or more monomeric compounds comprising a silane having 1 to 4 fluoroalkyl and/or perfluoroalkyl groups that may be the same or different; and wherein the optical cover assembly demonstrates an initial deionized water contact angle of at least 110°, (or at least 112°, or at least 115°), and demonstrates a deionized water contact angle of at least 900 after subjection of the optical cover assembly to test conditions according to ASTM D7869-17 for 3000 hours; and wherein the article comprises a component of at least one of a vehicle, a light sensor, a LiDAR detector, a motion sensor, a vision camera, a backup camera, a security camera, an IR camera, a headlight, a taillight, a signal light, a RADAR emitter, a RADAR detector, an aircraft landing light, and a gas detector.

In a second aspect, the article of the first aspect wherein the optical cover assembly demonstrates a single side integrated specular-only reflectance of less than 1.5%, or less than 1.0%, or less than 0.5%, in a wavelength range from 450 nm to 650 nm.

In a third aspect, the article of any of the preceding aspects wherein the optical cover assembly demonstrates a single side integrated specular-only reflectance of less than 1.5%, or less than 1.0%, or less than 0.5% in a wavelength range from 895 nm to 915 nm.

In a fourth aspect, the article of any of the preceding aspects wherein the film thickness of each layer of the anti-reflective coating stack (C) varies across its cross section by no more than 5 nm, or 3 nm, or 1 nm.

In a fifth aspect, the article of any of the preceding aspects wherein the optical cover assembly is on a vehicle.

In a sixth aspect, the article of any of the preceding aspects wherein the substrate (A) comprises soda-lime glass, aluminum-silicate glass, boron-silicate glass, silica glass, polymethylmethacrylate, polycarbonate, polyurea-urethane, polyethylene terephthalate, or allyl diglycol carbonate.

In a seventh aspect, the article of the sixth aspect wherein the substrate (A) comprises polycarbonate; and wherein the first coating layer (B) is applied directly to the outer surface of the substrate (A).

In an eighth aspect, the article of the sixth aspect wherein the substrate (A) comprises soda-lime glass, aluminum-silicate glass, boron-silicate glass, or silica glass; and wherein the anti-reflective coating stack (C) is applied directly to the outer surface of the substrate (A).

In a ninth aspect, the article of any of the preceding aspects wherein the article is a component of a vision camera on an autonomous vehicle.

In a tenth aspect, the article of any of the first through eighth aspects wherein the article is a component of a LiDAR detector on an autonomous vehicle.

In an eleventh aspect, the article of any of the first through eighth aspects wherein the article is a component of a light sensor.

In a twelfth aspect, the article of any of the first through eighth aspects wherein the article is a component of a motion sensor.

In a thirteenth aspect, the article of any of the first through eighth aspects wherein the article is a component of a backup camera.

In a fourteenth aspect, the article of any of the first through eighth aspects wherein the article is a component of a security camera.

In a fifteenth aspect, the article of any of the first through eighth aspects wherein the article is a component of an IR camera.

In a sixteenth aspect, the article of any of the first through eighth aspects wherein the article is a component of a taillight.

In a seventeenth aspect, the article of any of the first through eighth aspects wherein the article is a component of a signal light.

In an eighteenth aspect, the article of any of the first through eighth aspects wherein the article is a component of a RADAR emitter.

In a nineteenth aspect, the article of any of the first through eighth aspects wherein the article is a component of a RADAR detector.

In a twentieth aspect, the article of any of the first through eighth aspects wherein the article is a component of an aircraft landing light.

In a twenty-first aspect, the article of any of the first through eighth aspects wherein the article is a component of a gas detector.

In a twenty-second aspect, the article of any of the preceding aspects, wherein the first coating layer (B) is applied directly to at least the outer surface of the substrate and comprises an acrylic polymer, a sol-gel, or a polysiloxane polymer coating.

In a twenty-third aspect, the article of any of the preceding aspects, wherein the anti-reflective coating stack comprises multiple coating layers.

In a twenty-fourth aspect, the article of any of the preceding aspects, wherein the topmost coating layer (D) comprises a fluorosilane polymer with a weight average molecular weight of 3000 to 7000, such as 4000, as measured by gel permeation chromatography using a polystyrene standard, and wherein the topmost coating layer (D) has a thickness of less than 50 nm.

In a twenty-fifth aspect, the article of any of the preceding aspects, wherein the topmost coating layer (D) is applied either directly to the anti-reflective coating stack (C) or indirectly to the anti-reflective coating stack (C) on top of an intervening layer.

In a twenty-sixth aspect, the article of any of the preceding aspects wherein each of the coating layers (B) and (C) are coated on both opposing surfaces of the substrate, and the optical cover assembly further comprises:

(D') an anti-fogging coating layer applied as a topmost layer on the inner surface of the substrate, either directly to the anti-reflective coating stack (C) or indirectly to the anti-reflective coating stack (C) on top of an intervening layer; wherein the anti-fogging coating layer (D') demonstrates an initial water contact angle of less than 15°, or less than 10°, or less than 5°.

In a twenty-seventh aspect, the article of the twenty-sixth aspect, wherein the article is a component of a headlight.

In a twenty-eighth aspect, the article of any of the preceding aspects, wherein none of the coating layers in the anti-reflective coating stack (C) are formed from alkoxysilane-containing compositions.

In a twenty-ninth aspect, the article of any of the preceding aspects, wherein at least one of the coating layers in the anti-reflective coating stack (C) is formed from at least one of $SiO_2$, $SiO_x$ where x is between 1 and 2 including 1 $ZrO_2$, $TiO_2$, $TiO$, $Ti_2O_3$, $Ti_2O_5$, $Al_2O_3$, $Ta_2O_5$, $CeO_2$, $MgO$, $ZnO$, $Nb_2O_5$, $Y_2O_3$, $SnO_2$, $MgF_2$, and $WO_3$ and is applied via physical vapor deposition.

In a thirtieth aspect, a LiDAR detector component comprising an optical cover assembly, wherein the optical cover assembly comprises:

(A) a polycarbonate substrate that is transparent at a light wavelength of 905 nm, comprising an outer surface and an opposing inner surface;

(B) a first coating layer comprising an acrylic polymer, a sol-gel, or a polysiloxane polymer applied directly to at least the outer surface of the substrate; wherein the first coating layer has a refractive index of 1.40 to 1.65 at a light wavelength of 550 nm as determined using Becke Line Method and a film thickness of at least 50 nm and less than 45 μm;

(C) an anti-reflective coating stack comprising at least one coating layer applied directly to the first coating layer, wherein the anti-reflective coating stack has a total film thickness of at least 50 nm and less than 1.0 μm; and (D) a topmost coating layer comprising a fluorosilane polymer on the outer surface of the substrate; wherein the fluorosilane polymer has a weight average molecular weight of at least 3000, or at least 3500, and at most 10,000, or at most 7000, and wherein the fluorosilane polymer comprises a perfluoropolyether that further comprises organosilane functional groups comprising alkoxysilane and/or alkylsilane groups, and/or wherein the fluorosilane polymer is prepared from one or more monomeric compounds comprising a silane having 1 to 4 fluoroalkyl and/or perfluoroalkyl groups that may be the same or different; and wherein the optical cover assembly demonstrates an initial deionized water contact angle of at least 110°, or at least 112°, or at least 115°, and demonstrates a deionized water contact angle of at least 90° after subjection of the optical cover assembly to test conditions according to ASTM D7869-17 for 3000 hours.

In a thirty-first aspect, the LiDAR detector component of the thirtieth aspect wherein each of the coating layers (B) and (C) are coated on both opposing surfaces of the substrate, and the optical cover assembly further comprises:

(D') an anti-fogging coating layer applied as a topmost layer on the inner surface of the substrate, either directly to the anti-reflective coating stack (C) or indirectly to the anti-reflective coating stack (C) on top of an intervening layer, wherein the anti-fogging coating layer (D') demonstrates an initial water contact angle of less than 15°, or less than 10°, or less than 5°.

In a thirty-second aspect, the LiDAR detector component of the thirtieth or thirty-first aspect wherein the optical cover assembly demonstrates a single side integrated specular-only reflectance of light less than 1.5%, or less than 1.0%, or less than 0.5%, in a wavelength range from 895 nm to 915 nm.

In a thirty-third aspect, the LiDAR detector component of any of the thirtieth to thirty-second aspects, wherein the topmost coating layer (D) is applied either directly to the anti-reflective coating stack (C) or indirectly to the anti-reflective coating stack (C) on top of an intervening layer.

In a thirty-fourth aspect, a LiDAR detector component comprising an optical cover assembly, wherein the optical cover assembly comprises:

(A) a glass substrate that is transparent at a light wavelength of 905 nm, comprising an outer surface and an opposing inner surface; wherein the glass substrate comprises soda-lime glass, aluminum-silicate glass, boron-silicate glass, or silica glass;

(B) an anti-reflective coating stack comprising at least one coating layer applied directly to the first coating layer, wherein the anti-reflective coating stack has a total film thickness of at least 50 nm and less than 1.0 μm; and (C) a topmost coating layer comprising a fluorosilane polymer on the outer surface of the substrate; wherein the fluorosilane polymer has a weight average molecular weight of at least 3000, or at least 3500, and at most 10,000, or at most 7000, and wherein the fluorosilane polymer comprises a perfluoropolyether that further comprises organosilane functional groups comprising alkoxysilane and/or alkylsilane groups, and/or wherein the fluorosilane polymer is prepared from one or more monomeric compounds comprising a silane having 1 to 4 fluoroalkyl and/or perfluoroalkyl groups that may be the same or different; and wherein the optical cover assembly demonstrates an initial deionized water contact angle of at least 110°, or at least 112°, or at least 115°, and demonstrates a deionized water contact angle of at least 90° after subjection of the optical cover assembly to test conditions according to ASTM D7869-17 for 3000 hours.

In a thirty-fifth aspect, the LiDAR detector component of the thirty-fourth aspect wherein the anti-reflective coating stack (B) is coated on both opposing surfaces of the substrate, and the optical cover assembly further comprises: (C') an anti-fogging coating layer applied as a topmost layer on the inner surface of the substrate, either directly to the anti-reflective coating stack (B) or indirectly to the anti-reflective coating stack (B) on top of an intervening layer, wherein the anti-fogging coating layer (C') demonstrates an initial water contact angle of less than 15°, or less than 10°, or less than 5°.

In a thirty-sixth aspect, the LiDAR detector component of the thirty-fourth or thirty-fifth aspect, wherein the optical cover assembly demonstrates a single side integrated specular-only reflectance of light less than 1.5%, or less than 1.0%, or less than 0.5%, in a wavelength range from 895 nm to 915 nm.

In a thirty-seventh aspect, the LiDAR detector component of any of the thirty-fourth to thirty-sixth aspects, wherein the coating layer (C) is applied either directly to the anti-reflective coating stack (B) or indirectly to the anti-reflective coating stack (B) on top of an intervening layer.

In a thirty-eighth aspect, a vehicle headlight cover comprising an optical cover assembly, wherein the optical cover assembly comprises:

(A) a polycarbonate substrate comprising an outer surface and an opposing inner surface;

(B) a first coating layer comprising an acrylic polymer, a sol-gel, or a polysiloxane polymer applied directly to at least the outer surface of the substrate; wherein the first coating layer has a refractive index of 1.40 to 1.65 at a light wavelength of 550 nm as determined using Becke Line Method and a film thickness of at least 50 nm and less than 45 μm;

(C) an anti-reflective coating stack comprising at least one coating layer applied directly to the first coating layer, wherein the anti-reflective coating stack has a total film thickness of at least 50 nm and less than 1.0 μm; and (D) a topmost coating layer comprising a fluorosilane polymer on the outer surface of the substrate; wherein the fluorosilane polymer has a weight average molecular weight of at least 3000, or at least 3500, and at most 10,000, or at most 7000, and wherein the fluorosilane polymer comprises a perfluoropolyether that further comprises organosilane functional groups comprising alkoxysilane and/or alkylsilane groups, and/or wherein the fluorosilane polymer is prepared from one or more monomeric compounds comprising a silane having 1 to 4 fluoroalkyl and/or perfluoroalkyl groups that may be the same or different; and wherein the optical cover assembly demonstrates an initial deionized water contact angle of at least 110°, or at least 112°, or at least 115°, and demonstrates a deionized water contact angle of at least 90° after subjection of the optical cover assembly to test conditions according to ASTM D7869-17 for 3000 hours.

In a thirty-ninth aspect, the vehicle headlight cover of the thirty-eighth aspect wherein each of the coating layers (B) and (C) are coated on both opposing surfaces of the substrate, and the optical cover assembly further comprises:
  (D') an anti-fogging coating layer applied as a topmost layer on the inner surface of the substrate, either directly to the anti-reflective coating stack (C) or indirectly to the anti-reflective coating stack (C) on top of an intervening layer; wherein the anti-fogging coating layer (D') demonstrates an initial water contact angle of less than 15°, or less than 10°, or less than 5°.

In a fortieth aspect, the vehicle headlight cover of the thirty-eighth or thirty-ninth aspect wherein the optical cover assembly demonstrates a single side integrated specular-only reflectance of less than 1.5%, or less than 1.0%, or less than 0.5%, in a wavelength range from 450 nm to 650 nm.

In a forty-first aspect, the vehicle headlight cover of any of the thirty-eighth to fortieth aspects, wherein the optical cover assembly demonstrates a haze value of less than 0.5% after subjection of the optical cover assembly to test conditions according to ASTM D7369-17 for 3000 hours.

In a forty-second aspect, the vehicle headlight cover of any of claims the thirty-eighth to forty-first aspects, wherein the topmost coating layer (C) is applied either directly to the anti-reflective coating stack (C) or indirectly to the anti-reflective coating stack (C) on top of an intervening layer.

In a forty-third aspect, a camera component comprising an optical cover assembly, wherein the optical cover assembly comprises:
  (A) a glass substrate comprising an outer surface and an opposing inner surface; wherein the glass substrate comprises soda-lime glass, aluminum-silicate glass, boron-silicate glass, or silica glass;
  (B) an anti-reflective coating stack comprising at least one coating layer applied directly to the first coating layer, wherein the anti-reflective coating stack has a total film thickness of at least 50 nm and less than 1.0 μm; and
  (C) a topmost coating layer comprising a fluorosilane polymer on the outer surface of the substrate; wherein the fluorosilane polymer has a weight average molecular weight of at least 3000, or at least 3500, and at most 10,000, or at most 7000, and wherein the fluorosilane polymer comprises a perfluoropolyether that further comprises organosilane functional groups comprising alkoxysilane and/or alkylsilane groups, and/or wherein the fluorosilane polymer is prepared from one or more monomeric compounds comprising a silane having 1 to 4 fluoroalkyl and/or perfluoroalkyl groups that may be the same or different; and wherein the optical cover assembly demonstrates an initial deionized water contact angle of at least 110°, or at least 112°, or at least 1150, and demonstrates a deionized water contact angle of at least 90° after subjection of the optical cover assembly to test conditions according to ASTM D7869-17 for 3000 hours.

In a forty-fourth aspect, the camera component of the forty-third aspect wherein the anti-reflective coating stack (B) is coated on both opposing surfaces of the substrate, and the optical cover assembly further comprises:
  (C') an anti-fogging coating layer applied as a topmost layer on the inner surface of the substrate, either directly to the anti-reflective coating stack (B) or indirectly to the anti-reflective coating stack (B) on top of an intervening layer, wherein the anti-fogging coating layer (C') demonstrates an initial water contact angle of less than 15°, or less than 10°, or less than 5°.

In a forty-fifth aspect, the camera component of the forty-third or forty-fourth aspect, wherein the optical cover assembly demonstrates a single side integrated specular-only reflectance of light less than 1.5%, or less than 1.0%, or less than 0.5% in a wavelength range from 450 nm to 650 nm.

In a forty-sixth aspect, the camera component of any of the forty-third to forty-fifth aspects, wherein the optical cover assembly demonstrates a haze value of less than 0.5% after subjection of the optical cover assembly to test conditions according to ASTM D7869-17 for 3000 hours.

In a forty-seventh aspect, the camera component of any of the forty-third to forty-sixth aspects, wherein the camera component is on a vehicle and comprises a lens or lens screen.

In a forty-eighth aspect, the camera component of any of the forty-third to forty-seventh aspects, wherein the coating layer (C) is applied either directly to the anti-reflective coating stack (B) or indirectly to the anti-reflective coating stack (B) on top of an intervening layer.

Whereas particular embodiments of this invention have been described above for purposes of illustration, it will be evident to those skilled in the art that numerous variations of the details of the present invention may be made without departing from the scope of the invention as defined in the appended claims.

Therefore, we claim:
  1. An article comprising an optical cover assembly wherein the optical cover assembly comprises:
    (A) a substrate comprising an outer surface and an opposing inner surface; wherein the substrate demonstrates a refractive index of at least 1.40 at a light wavelength of 550 nm as determined using Becke Line Method;
    (B) an optional first coating layer applied directly to both opposing surfaces of the substrate; wherein the first coating layer, if used, has a film thickness of at least 50 nm and less than 45 μm and a refractive index of 1.40 to 1.65 at a light wavelength of 550 nm as determined using Becke Line Method;
    (C) an anti-reflective coating stack comprising multiple coating layers, wherein the anti-reflective coating stack is applied directly to the first coating layer (B) on both opposing surfaces if used or applied directly to both opposing surfaces of the substrate (A) if the first coating layer is not used, and wherein the anti-reflective coating stack has a total film thickness of at least 50 nm and less than 1.0 μm;
    (D) a topmost coating layer comprising a fluorosilane polymer on the outer surface of the substrate; wherein the fluorosilane polymer has a weight average molecular weight of at least 3000, or at least 3500, and at most 10,000, or at most 7000, and wherein the fluorosilane polymer comprises a perfluoropolyether that further comprises organosilane functional groups comprising alkoxysilane and/or alkylsilane groups, and/or wherein the fluorosilane polymer is prepared from one or more monomeric compounds comprising a silane having 1 to 4 fluoroalkyl and/or perfluoroalkyl groups that may be the same or different; and (D') an anti-fogging coating layer applied as a topmost layer on the inner surface of the substrate, either directly to the anti-reflective coating stack (C) or indirectly to the anti-reflective coating stack (C) on top of an intervening layer; wherein the anti-fogging coating layer (D') demonstrates an initial water contact angle of less than 15°, or less than 10°, or less than 5°; and wherein the optical cover assembly demonstrates an initial deionized water contact angle of at least 110°, (or at least 112°, or at least) 115°, and demonstrates a deionized water contact angle of at least 90° after subjection of the optical cover assembly to test conditions according to ASTM D7869-17 for 3000 hours; and wherein the article is a component of at least one of a vehicle, a light sensor, a LIDAR detector, a motion sensor, a vision camera, a backup camera, a security camera, an IR camera, a headlight, a taillight, a signal light, a RADAR emitter, a RADAR detector, an aircraft landing light, and a gas detector.

2. The article of claim 1 wherein the optical cover assembly demonstrates a single side integrated specular-only reflectance of less than 1.5%, or less than 1.0%, or less than 0.5%, in a wavelength range from 450 nm to 650 nm.

3. The article of claim 1 wherein the optical cover assembly demonstrates a single side integrated specular-only reflectance of less than 1.5%, or less than 1.0%, or less than 0.5% in a wavelength range from 895 nm to 915 nm.

4. The article of claim 1 wherein the film thickness of each layer of the anti-reflective coating stack (C) varies across its cross section by no more than 5 nm, or 3 nm, or 1 nm.

5. The article of claim 1 wherein the substrate (A) comprises soda-lime glass, aluminum-silicate glass, boron-silicate glass, silica glass, polymethylmethacrylate, polycarbonate, polyurea-urethane, polyethylene terephthalate, or allyl diglycol carbonate.

6. The article of claim 5 wherein the substrate (A) comprises polycarbonate; and wherein the first coating layer (B) is applied directly to both surfaces of the substrate (A).

7. The article of claim 5 wherein the substrate (A) comprises soda-lime glass, aluminum-silicate glass, boron-silicate glass, or silica glass; and wherein the anti-reflective coating stack (C) is applied directly to both surfaces of the substrate (A).

8. The article of claim 1 wherein the article is a component of a vision camera on an autonomous vehicle.

9. The article of claim 1 wherein the article is a component of a LiDAR detector on an autonomous vehicle.

10. The article of claim 1, wherein the first coating layer (B) is applied directly to both surfaces of the substrate and comprises an acrylic polymer, a sol-gel, or a polysiloxane polymer coating.

11. The article of claim 1, wherein the topmost coating layer (D) comprises a fluorosilane polymer with a weight average molecular weight of 3000 to 7000, as measured by gel permeation chromatography using a polystyrene standard, and wherein the topmost coating layer (D) has a thickness of less than 50 nm.

12. The article of claim 1, wherein the topmost coating layer (D) is applied either directly to the anti-reflective coating stack (C) or indirectly to the anti-reflective coating stack (C) on top of an intervening layer.

13. The article of claim 1 wherein the optical cover assembly is a component of a headlight, and wherein each of the coating layers (B) and (C) are coated on both opposing surfaces of the substrate.

14. The article of claim 1, wherein none of the coating layers in the anti-reflective coating stack (C) are formed from alkoxysilane-containing compositions.

15. The article of claim 1, wherein at least one of the coating layers in the anti-reflective coating stack (C) is formed from at least one of $SiO_2$, $SiO_x$ where x is between 1 and 2 including 1, $ZrO_2$, $TiO_2$, $TiO$, $Ti_2O_3$, $Ti_2O_5$, $Al_2O_3$, $Ta_2O_5$, $CeO_2$, $MgO$, $Y_2O_3$, $ZnO$, $SnO_2$, $Nb_2O_5$, $MgF_2$, and $WO_3$ and is applied via physical vapor deposition.

16. The article of claim 1, wherein the article is a LIDAR detector component, wherein:

(A) the substrate comprises a polycarbonate substrate that is transparent at a light wavelength of 905 nm, comprising an outer surface and an opposing inner surface; and (B) the first coating layer comprises an acrylic polymer, a sol-gel, or a polysiloxane polymer applied directly to both surfaces of the substrate.

17. The article of claim 16, wherein the topmost coating layer (D) is applied either directly to the anti-reflective coating stack (C) or indirectly to the anti-reflective coating stack (C) on top of an intervening layer.

18. The article of claim 1, wherein the article is a LIDAR detector component, wherein:

(A) the substrate comprises a glass substrate that is transparent at a light wavelength of 905 nm, comprising an outer surface and an opposing inner surface; wherein the glass substrate comprises soda-lime glass, aluminum-silicate glass, boron-silicate glass, or silica glass; and (C) the anti-reflective coating stack comprising multiple coating layers is applied directly to the glass substrate on both opposing surfaces, wherein the anti-reflective coating stack has a total film thickness of at least 50 nm and less than 1.0 μm.

* * * * *